United States Patent
Wong et al.

(10) Patent No.: US 7,856,226 B2
(45) Date of Patent: *Dec. 21, 2010

(54) SYSTEMS AND METHODS FOR IMS USER SESSIONS WITH DYNAMIC SERVICE SELECTION

(75) Inventors: Ellis L. Wong, Lexington, MA (US); Shamim A. Naqvi, Boston, MA (US); Anju Day, Concord, MA (US)

(73) Assignee: Aylus Networks, Inc., Westford, MA (US)

( * ) Notice: Subject to any disclaimer, the term of this patent is extended or adjusted under 35 U.S.C. 154(b) by 853 days.

This patent is subject to a terminal disclaimer.

(21) Appl. No.: 11/787,635

(22) Filed: Apr. 17, 2007

(65) Prior Publication Data

US 2008/0261593 A1 Oct. 23, 2008

(51) Int. Cl.
*H04M 3/42* (2006.01)
(52) U.S. Cl. .............. 455/414.1; 455/435.1; 455/414.3; 370/259
(58) Field of Classification Search ...... 455/414.1–417, 455/435.1; 370/389, 392, 400–402, 259–269, 370/351–356, 546, 428; 709/223, 238, 230, 709/228
See application file for complete search history.

(56) References Cited

U.S. PATENT DOCUMENTS

| 4,736,407 | A | 4/1988 | Dumas |
|---|---|---|---|
| 6,014,706 | A | 1/2000 | Cannon et al. |
| 6,018,662 | A | 1/2000 | Periyalwar et al. |
| 6,032,053 | A | 2/2000 | Schroeder et al. |
| 6,374,112 | B1 | 4/2002 | Widegren et al. |
| 6,574,326 | B1 | 6/2003 | Wong et al. |
| 6,608,832 | B2 | 8/2003 | Forslow |
| 6,694,145 | B2 * | 2/2004 | Riikonen et al. ............ 455/502 |

(Continued)

FOREIGN PATENT DOCUMENTS

EP 1435748 7/2004

(Continued)

OTHER PUBLICATIONS

International Search Report, International Application No. PCT/US 06/24619, date mailed Feb. 14, 2007 (1 page).

(Continued)

*Primary Examiner*—Kamran Afshar
*Assistant Examiner*—Marisol Fahnert
(74) *Attorney, Agent, or Firm*—Wilmer Cutler Pickering Hale and Dorr LLP

(57) ABSTRACT

Under one aspect, a system generates dynamic call models within an IMS network, allowing different user entities (UEs) to have different service experiences. The IMS network includes application servers (ASs) and a serving call state control function (S-CSCF) that receives and then forwards UE service requests. The system includes storage media storing a service tree, which defines potential call models that map potential UE service requests onto ASs. At least two potential call models map a specified potential UE service request onto different ASs that can provide different service experiences. The system includes control logic for providing session control, which receives UE service requests from the S-CSCF, receives the service tree from the storage media, generates a call model for each UE based on potential call models defined by the service tree and on the requested service, and invokes a specified AS based on the generated call model.

13 Claims, 8 Drawing Sheets

U.S. PATENT DOCUMENTS

| | | | |
|---|---|---|---|
| 6,782,412 | B2 | 8/2004 | Brophy et al. |
| 6,888,828 | B1 | 5/2005 | Partanen et al. |
| 6,950,655 | B2 | 9/2005 | Hunkeler et al. |
| 7,299,049 | B2 | 11/2007 | Jagadeesan |
| 7,301,938 | B2 | 11/2007 | Ejzak |
| 7,353,021 | B2 | 4/2008 | Ejzak et al. |
| 2002/0059416 | A1* | 5/2002 | Tuunanen .................. 709/223 |
| 2002/0140726 | A1 | 10/2002 | Schwartz et al. |
| 2002/0181462 | A1 | 12/2002 | Surdila et al. |
| 2003/0026245 | A1 | 2/2003 | Ejzak |
| 2003/0027569 | A1 | 2/2003 | Ejzak |
| 2003/0027595 | A1 | 2/2003 | Ejzak |
| 2003/0055974 | A1 | 3/2003 | Brophy et al. |
| 2003/0134636 | A1 | 7/2003 | Sundar et al. |
| 2003/0193426 | A1 | 10/2003 | Vidal |
| 2004/0008669 | A1 | 1/2004 | Bos et al. |
| 2004/0019539 | A1 | 1/2004 | Raman et al. |
| 2004/0043766 | A1 | 3/2004 | Sashihara |
| 2004/0043776 | A1 | 3/2004 | Tuomela et al. |
| 2004/0068574 | A1* | 4/2004 | Costa Requena et al. .... 709/230 |
| 2004/0076145 | A1 | 4/2004 | Kauhanen et al. |
| 2004/0083195 | A1 | 4/2004 | McCord et al. |
| 2004/0107143 | A1 | 6/2004 | Niemi |
| 2004/0162892 | A1 | 8/2004 | Hsu |
| 2004/0190498 | A1 | 9/2004 | Kallio et al. |
| 2004/0193700 | A1 | 9/2004 | Westman et al. |
| 2004/0193725 | A1* | 9/2004 | Costa-Requena et al. ... 709/238 |
| 2004/0205212 | A1* | 10/2004 | Huotari et al. .............. 709/230 |
| 2004/0219912 | A1 | 11/2004 | Johansson et al. |
| 2004/0240430 | A1 | 12/2004 | Lin et al. |
| 2004/0249887 | A1 | 12/2004 | Garcia-Martin et al. |
| 2004/0249962 | A1 | 12/2004 | Lecomte |
| 2004/0252673 | A1 | 12/2004 | Ejzak et al. |
| 2004/0261116 | A1 | 12/2004 | Mckeown et al. |
| 2005/0025047 | A1 | 2/2005 | Bodin et al. |
| 2005/0025163 | A1 | 2/2005 | Christie |
| 2005/0043020 | A1 | 2/2005 | Lipsanen et al. |
| 2005/0047399 | A1 | 3/2005 | Lee et al. |
| 2005/0050194 | A1 | 3/2005 | Honeisen et al. |
| 2005/0058125 | A1 | 3/2005 | Mutikainen et al. |
| 2005/0083909 | A1 | 4/2005 | Kuusinen et al. |
| 2005/0089020 | A1 | 4/2005 | Ahlback et al. |
| 2005/0136926 | A1 | 6/2005 | Tammi et al. |
| 2005/0141484 | A1 | 6/2005 | Rasanen |
| 2005/0170861 | A1 | 8/2005 | Niemi et al. |
| 2005/0190772 | A1 | 9/2005 | Tsai et al. |
| 2005/0213606 | A1 | 9/2005 | Huang et al. |
| 2005/0227681 | A1 | 10/2005 | Li |
| 2005/0237933 | A1 | 10/2005 | Marjelund et al. |
| 2005/0243870 | A1 | 11/2005 | Balogh et al. |
| 2005/0245261 | A1 | 11/2005 | Ejzak |
| 2005/0271011 | A1 | 12/2005 | Alemany et al. |
| 2005/0286531 | A1 | 12/2005 | Tuohino et al. |
| 2006/0015812 | A1 | 1/2006 | Cunningham et al. |
| 2006/0025151 | A1 | 2/2006 | Karaoguz et al. |
| 2006/0031888 | A1 | 2/2006 | Sparrell |
| 2006/0062206 | A1 | 3/2006 | Krishnaswamy |
| 2006/0083199 | A1 | 4/2006 | Yang |
| 2006/0089143 | A1 | 4/2006 | Jagadeesan |
| 2006/0104262 | A1 | 5/2006 | Kant et al. |
| 2006/0114987 | A1 | 6/2006 | Roman |
| 2006/0120287 | A1 | 6/2006 | Foti et al. |
| 2006/0121902 | A1 | 6/2006 | Jagadeesan et al. |
| 2006/0136557 | A1 | 6/2006 | Schaedler et al. |
| 2006/0140150 | A1 | 6/2006 | Olvera-Hernandez et al. |
| 2006/0155814 | A1 | 7/2006 | Bennett et al. |
| 2006/0161512 | A1 | 7/2006 | Schaedler et al. |
| 2006/0164550 | A1 | 7/2006 | Yoshimoto et al. |
| 2006/0183478 | A1 | 8/2006 | Jagadeesan et al. |
| 2006/0209768 | A1 | 9/2006 | Yan et al. |
| 2006/0221903 | A1 | 10/2006 | Kauranen et al. |
| 2006/0246903 | A1 | 11/2006 | Kong et al. |
| 2006/0256751 | A1 | 11/2006 | Jagadeesan et al. |
| 2006/0258394 | A1 | 11/2006 | Dhillon et al. |
| 2006/0262806 | A1 | 11/2006 | Bouazizi |
| 2006/0291412 | A1 | 12/2006 | Naqvi et al. |
| 2006/0291419 | A1 | 12/2006 | McConnell et al. |
| 2006/0291437 | A1 | 12/2006 | Naqvi et al. |
| 2006/0291484 | A1 | 12/2006 | Naqvi et al. |
| 2006/0291487 | A1 | 12/2006 | Naqvi et al. |
| 2006/0291488 | A1 | 12/2006 | Naqvi et al. |
| 2006/0291489 | A1 | 12/2006 | Naqvi et al. |
| 2006/0294244 | A1 | 12/2006 | Naqvi et al. |
| 2007/0008913 | A1 | 1/2007 | Naqvi et al. |
| 2007/0008951 | A1 | 1/2007 | Naqvi et al. |
| 2007/0014281 | A1 | 1/2007 | Kant |
| 2007/0033286 | A1 | 2/2007 | Min |
| 2007/0053343 | A1 | 3/2007 | Suotula et al. |
| 2007/0066347 | A1 | 3/2007 | Silverbrook et al. |
| 2007/0067807 | A1 | 3/2007 | O'Neil |
| 2007/0091855 | A1 | 4/2007 | Karaoguz et al. |
| 2007/0110043 | A1 | 5/2007 | Girard |
| 2007/0111752 | A1 | 5/2007 | Pazhyannur |
| 2007/0165572 | A1 | 7/2007 | Lenzarini |
| 2007/0197227 | A1 | 8/2007 | Naqvi et al. |
| 2007/0207802 | A1 | 9/2007 | Palmer et al. |
| 2007/0207804 | A1 | 9/2007 | Sharma et al. |
| 2007/0217349 | A1 | 9/2007 | Fodor et al. |
| 2007/0217366 | A1 | 9/2007 | Sagi et al. |
| 2007/0226344 | A1 | 9/2007 | Sparrell et al. |
| 2008/0043717 | A1 | 2/2008 | Bellora et al. |
| 2008/0130637 | A1 | 6/2008 | Kant et al. |
| 2008/0316998 | A1 | 12/2008 | Procopio et al. |

OTHER PUBLICATIONS

International Search Report, International Application PCT/US 08/60644, mailed Jun. 27, 2008 (9 pages).

OSGi Service Platform. Mar. 2003, The Open Services Gateway Initiative, Release 3. pp. 345-346, 505, 513-526 (602 pages).

Definition of 'proxy' from dictionary.com, http://dictionary.reference.com/browse/proxy, printed Mar. 14, 2009 (5 pages).

International Search Report, International Application No. PCT/US 06/24624, mailed Apr. 3, 2007 (1 page).

International Search Report for International Application No. PCT/US07/04854, Aylus Networks, Inc., Jan. 31, 2008 (3 pages).

International Search Report for Application No. PCT/US08/57367, Aylus Networks, Inc., Aug. 8, 2008 (7 pages).

International Search Report and Written Opinion, International Application No. PCT/US08/60656, Aylus Networks, Inc., Jul. 2, 2008 (8 pages).

* cited by examiner

SYSTEMS AND METHODS FOR IMS USER SESSIONS WITH DYNAMIC SERVICE SELECTION

CROSS-REFERENCE TO RELATED APPLICATIONS

This application is related to the following applications, the entire contents of which are incorporated herein by reference: U.S. patent application Ser. No. 11/282,924, filed Nov. 18, 2005 and entitled "IMS Networks with AVS Sessions with Multiple Access Networks;" U.S. patent application Ser. No. 11/166,470, filed Jun. 24, 2005 and entitled "System and Method for Providing Dynamic Call Models for Users in an IMS Network;" and U.S. patent application Ser. No. 11/504,896, filed Aug. 16, 2006, and entitled "System and Method for Enabling Combinational Services in Wireless Networks by Using a Service Delivery Platform."

BACKGROUND

1. Field of the Invention

This invention generally relates to wireless networks and to IP Multimedia Subsystem (IMS) networks.

2. Description of Related Art

Multimedia sessions are typically carried by a packet-switched wireless network, such as the IP Multimedia Subsystem (IMS). The IMS architecture manages the network with several control functions, i.e., functional entities. FIG. 1 is a schematic illustration of select functional entities typical of a conventional IMS network and their interaction with a user's handset. The IMS network includes a control plane 100, which is partitioned into a switching layer 110 and a service layer 120. The switching layer 110 is controlled by, a logical function called the Call State Control Function (CSCF), which is logically partitioned into three functional entities, the Proxy, Interrogating and Serving CSCFs. The Proxy Call State Control Function (P-CSCF) 104 is the first contact point for a user's handset 102, also referred to herein as the User Entity (UE). The Interrogating CSCF (I-CSCF) 106 is mainly the contact point within an operator's network for all IMS connections destined to a subscriber of that network operator, or a roaming subscriber currently located within that network operator's service area. The Serving CSCF (S-CSCF) 108 actually handles the session states in the network. The S-CSCF 108 interacts with the service layer 120 to provide services to the UE 102. More specifically, application servers (ASs) 122, 124, 126, which may be "third party" or part of the home network, provide services to the UE, such as voice mail, via the S-CSCF 108. The IMS controls packet services among the different functional entities with signaling protocols such as Session Initiation Protocol (SIP), which is an IP-based signaling protocol designed for multimedia communications.

When UE 102 first powers on, logic residing in the UE initiates a REGISTER procedure with the IMS core, first by requesting the mobile wireless access network (not shown) to assign it an IP address. After it receives an IP address, the UE 102 attempts to register as an IP-enabled endpoint with the IMS core, by sending a REGISTER request to the P-CSCF 104. Assuming that the UE 102 is registering from a visiting domain, the P-CSCF 104 then uses a Domain Name Server (DNS) to search for the UE's home domain S-CSCF 108. Once the P-CSCF 104 locates the S-CSCF 108 for the UE, it passes the REGISTER request to that S-CSCF 108. The S-CSCF 108 contacts the Home Subscriber Subsystem (HSS) 112, which looks up the UE's profile. This profile contains information about the UE 102, and what services the UE is authorized to use. A logical function in the S-CSCF 108 called the "registrar" then authenticates the UE 102, e.g., verifies that the UE is legitimate.

In a conventional IMS network, the HSS 112 also provides a list of Initial Filter Criteria (iFC) to the S-CSCF 108 via the UE's service profile during UE 102 registration. The S-CSCF 108 stores the iFC while the UE 102 is powered on. The iFC maps services requests onto the various application servers, and thus is effectively the "call model" for the UE 102. When the S-CSCF 108 receives a service request from either the UE 102 or from another entity, it triggers a Service Point Trigger (SPT) based on the iFC and the information contained within the service request. This information conventionally includes the calling party's Universal Resource Identifier (URI); and the Service Description Protocol (SDP), which describes any multimedia service requested, e.g., picture or video. The matching SPT defined in the iFC, in turn, invokes the appropriate Application Server (AS), e.g., AS 122, 124, or 126. For example, if the UE 102 requests voice mail service, the SPT triggers the S-CSCF 108 to forward the service request to the voice mail AS, e.g., AS 122.

If an entity wishes to engage in a transaction with the UE 102, e.g., to send a message to the UE, the entity utilizes an AS, e.g., AS 124, to send a request for the transaction to the S-CSCF 108. This may trigger an SPT in the S-CSCF 108 based on the iFC, and the S-CSCF, in this case, would forward the request to another AS. If there is no SPT triggered in S-CSCF for SIP requests received from this particular AS, the S-CSCF will route the SIP requests towards the destination. Other ASs may not know which S-CSCF 108 to contact in order to engage in a transaction with a particular UE 102. In this case, the AS interrogates a Subscriber Location Function (SLF) (not shown), which provides information about the UE's S-CSCF 108 to the AS, which then contacts that S-CSCF as described above. If the UE 102 wishes to request a service, it sends the request to the S-CSCF 108, e.g., using a SIP Invite message. This triggers an SPT in the S-CSCF based on the iFC, and the S-CSCF 108 then directs the service request to a particular Application Server (AS), which then provides the service to the UE 102. For example, if the user wants to initiate an IMS call, the UE 102 sends a SIP Invite message to the S-CSCF 108, which may then contact the AS responsible for IMS calls, e.g., AS 126.

A conventional IMS call model, based on iFCs, is a linear, static service provisioning and invocation model. Every UE subscriber with the same service subscription, within the same home service domain, is provisioned with an identical iFC which invokes the same or equivalent AS, e.g., AS 124, when the same service request is received. For example, video streaming service for each and every UE having such a service, in the domain of the S-CSCF 108, will point to the same AS or to an AS with service logic capable of providing the same video streaming service.

This limitation extends to Mobile Virtual Network Operators (MVNOs), which are entities that purchase a network provider's services wholesale, and then resell those services to their subscribers. MVNOs, through a business agreement, effectively use the network operator's facilities without owning the network infrastructure or spectrum license. Thus, wireless services can be offered by several MVNOs (as virtual service providers) using the same underlying network infrastructure. One problem with such an arrangement is that service differentiation is not possible amongst various MVNOs using a common network operator since these MVNOs are tied to the same network infrastructure, including the service logic. Thus, if two MVNOs, MVNO1 and MVNO2, both use the same network operator and both provide voice service, that service will be typically indistinguishable to end users of the voice service regardless of whether they use MVNO1 or MVNO2. Thus, MVNOs conventionally distinguish their services mainly through marketing, handsets, and billing.

FIG. 2 is a schematic of a conventional IMS service profile 200 for all UEs in the domain of a conventional S-CSCF 108. The domain includes UEs subscribing to a given network operator, as well as any UEs that may subscribe to MVNOs that use that network operator's equipment and license. The single service profile, i.e., one set of policies, governs all of the ASs, e.g., AS 122, 124, 126, that provide services in that domain. The conventional IMS service profile 200 includes a specification of standard services 210 associated with the service profile, including authentication, accounting, and addressing ("AAA") services. The service profile 200 also includes iFCs for various services that are authorized in the domain, for example, Instant Messaging (IM) 220 and Presence 230. The iFCs 220, 230 include SPT's that invoke an appropriate AS in response to a service request. Thus, when any UE within the domain requests, for example, the Instant Messaging service, the request invokes the Instant Messaging AS.

For further details on conventional call models, iFC's, SIP, SDP, Mobile Independent Handoff (MIH), IMS signaling protocols, and IMS networks in general, see, for example, the following technical specifications, the entire contents of which are incorporated herein by reference: 3GPP TS 23.228 V6.8.0 (2004-12); 3GPP TS 23.218 V6.3.0 (2005-03); 3GPP TS 24.228 V5.12.0 (2005-03); and 3GPP TS 24.229 V6.6.0 (2005-03).

SUMMARY

Preferred embodiments of the invention provide systems and methods for enabling IMS user sessions with dynamic service selection.

Under one aspect, a system generates dynamic call models within an IMS network so that different user entities (UEs) can have different IMS service experiences. The IMS network includes application servers (ASs) for providing services to the UEs based on service requests by the UEs. The IMS network also includes a serving call state control function (S-CSCF) for receiving service requests by the UEs and forwarding the requests. The system includes storage media storing a service tree, the service tree defining a plurality of potential call models, the potential call models mapping potential service requests by the UEs onto the ASs, at least two of the potential call models mapping a specified potential service request by a UE onto different ASs capable of providing different service experiences to the UE. The system also includes control logic for providing session control for the UEs. The control logic receives service requests by the UEs forwarded by the S-CSCF and receives the service tree from the storage media. The control logic also generates a call model for each UE based on the potential call models defined by the service tree and on the service requested by that UE. The control logic also invokes a specified AS based on the call model generated for that UE.

One or more embodiments include one or more of the following features. The control logic is in direct communication with the ASs. The storage media stores a plurality of service trees for different groups of UEs. The S-CSCF forwards service requests by the UEs to the based on a pre-configured initial filter criteria (iFC). The S-CSCF obtains the pre-configured iFC from a home subscriber subsystem (HSS). At least one UE includes agent logic to express a dynamic context of the UE in a message and to transmit the dynamic context message to the S-CSCF. The dynamic context of the UE includes an access network that becomes newly available to the UE. The S-CSCF forwards the service request message with dynamic context information to the control logic based on a pre-configured initial filter criteria (iFC). The control logic generates a new call model for the UE based on the forwarded dynamic context message. The control logic generates the call model based on a change in policy by a network operator using the control logic and the S-CSCF. A plurality of mobile virtual network operators (MVNOs) use the control logic and the S-CSCF to provide services to groups of UEs subscribing to the MVNOs, and at least some services that a first MVNO provides to a first subscribing group of UEs are different from at least some services that a second MVNO provides to a second subscribing group of UEs. The control logic uses the service tree to generate call models for the first and second groups of UEs, and wherein the service tree maps service requests by the first subscribing group of UEs to ASs owned by the first MVNO, and wherein the service tree maps service requests by the second subscribing group of UEs to ASs owned by the second MVNO.

Under another aspect, a method generates dynamic call models within an IMS network so that different user entities (UEs) can have different IMS experiences. The IMS network includes application servers (ASs) for providing services to the UEs based on service requests by the UEs. The IMS network also includes a serving call state control function (S-CSCF) for receiving service requests by the UEs and forwarding the requests. The method includes storing a service tree, the service tree defining a plurality of potential call models, the potential call models mapping potential service requests by the UEs onto the ASs, at least two of the potential call models mapping a specified potential service request by a UE onto different ASs capable of providing different service experiences to the UE. The method also includes providing session control for the UEs by receiving service requests by the UEs forwarded by the S-CSCF; receiving the stored service tree; and generating a call model for each UE based on the potential call models defined by the service tree and on the service requested by that UE.

DETAILED DESCRIPTION

Figure 1:
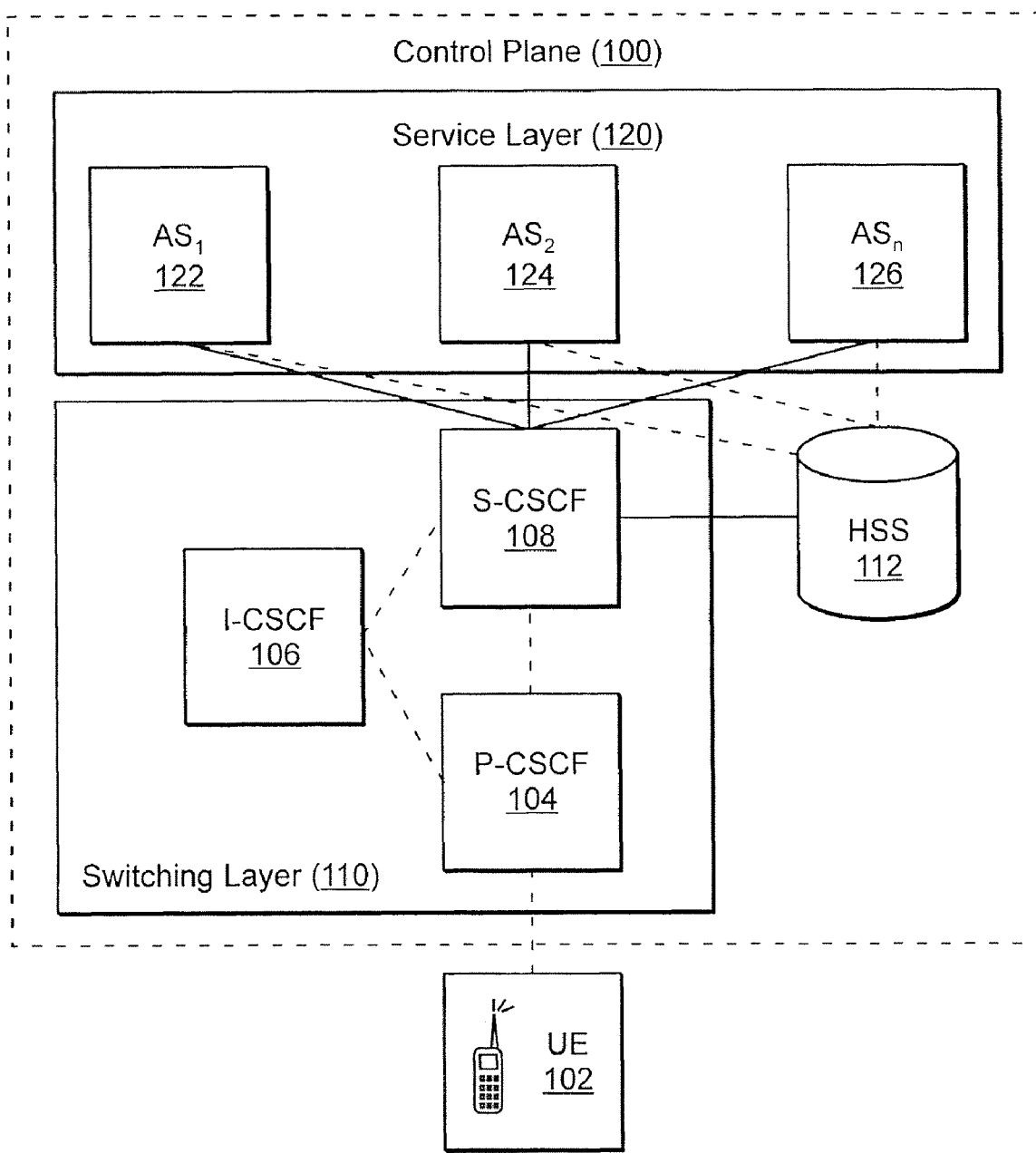
FIG. 1 is a schematic of components in a conventional IMS network.
Figure 2:
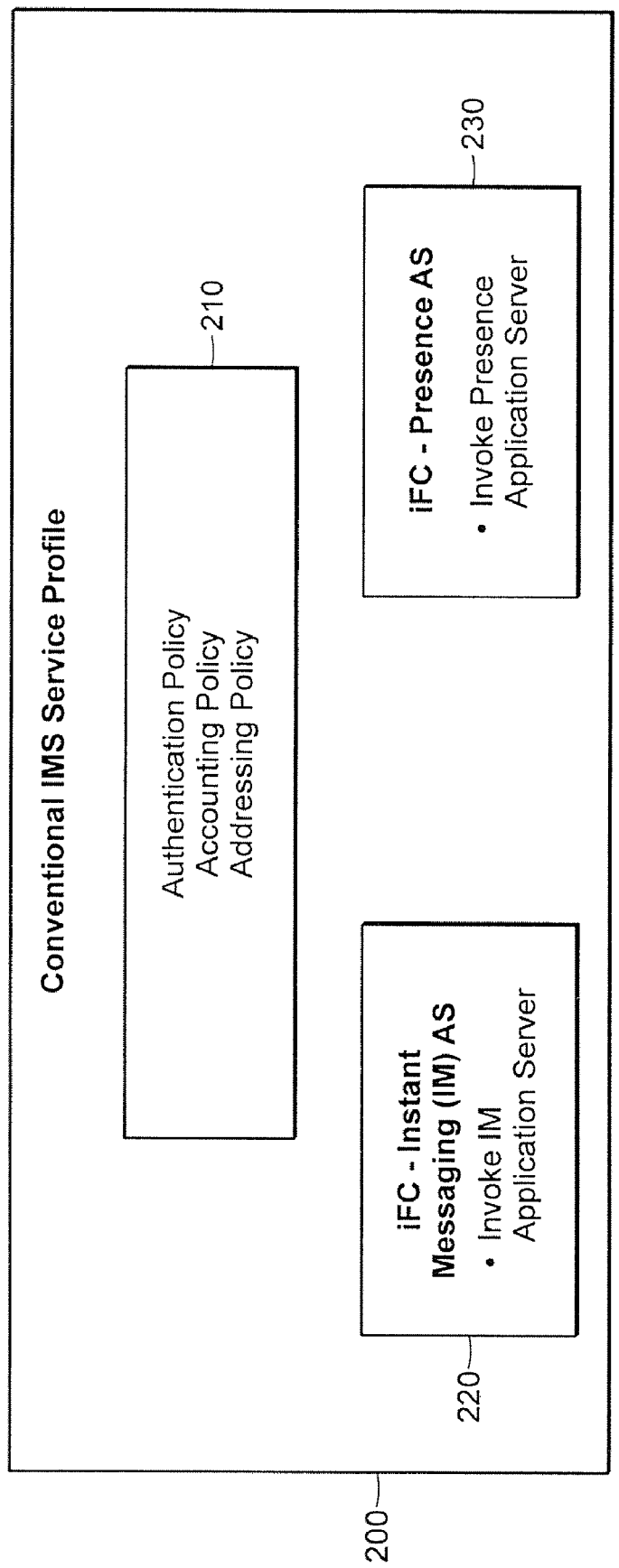
FIG. 2 is a schematic of a conventional Service Profile for generating a call model.

Preferred embodiments provide systems and methods for IMS user sessions with dynamic service selection. The systems and methods provide flexible ways for network operators to dynamically generate call models based on multiple parameters, such as the user's real-time network environment, for different service requests. This allows each user's call model, and therefore his or her "service experience," to be distinct. Thus, a first user may have specific service logic associated with a given service request (via the first user's call model), while a second user may have different service logic associated with the same service request (via the second user's call model). The call models may also adapt to the user's network environment, utilizing different capabilities and associated devices that may become available to a user during a session, or because the cost function for delivering a service over different available networks may change during a session. In contrast, conventional iFCs are static and therefore cannot adapt to a UE's changing environment, such as Access Networks that may become available. Similarly, conventional iFCs provide the same network experience to UEs purchasing service wholesale from the same network provider.

A conventional, static approach does not allow for any additional, next-level service differentiating logic to be invoked within the context of the current application logic. In contrast, in one exemplary embodiment of the hierarchical service logic invocation model described herein, separate versions of video streaming service logic can be applied based on whether the subscriber is invoking the streaming session from a 3G or Wi-Fi access network environment. The streaming session can invoke a seamless mobility service application to manage the service request based on the type of access network from which the request is received. Within the same streaming session context of the current access network, the next-level video streaming application logic is then applied. This hierarchical approach allows the context of the current level of service logic to select the next level service logic based on various dynamic service triggers. In the above example, the dynamic service trigger is the reception of a service request from a particular access network type.

On the other hand, the conventional IMS service model can only support the invocation of each application server (e.g., service logic) independently in sequential order, as they are provisioned in the list of iFCs associated with the user service profile. Thus, the conventional IMS session context within one application server is not passed on to the next application server even when needed in order to maintain continuity of the service flow.

In many embodiments described herein, the call models are based on "Service Trees." These Service Trees are hierarchically arranged iFCs that map a variety of UE service requests onto a variety of AS's. However, unlike conventional iFC's, the Service Trees do not merely provide a one-to-one mapping of service requests onto AS's, but rather provide a plurality of AS options for each service request. The AS selected can depend on multiple parameters and/or policies. In essence, the Service Trees may be thought of as multi-dimensional matrices providing a variety of service options based on a variety of parameters. For example, in some embodiments, the Service Trees allow UEs to dynamically use services available on Access Networks that appear in their environment in real-time, if the network operator policy permits the use. Or, for example, in some embodiments, the Service Trees allow Mobile Virtual Network Operators (MVNOs), who purchase and resell network service from a wholesaler, to provide distinctive services to their customers. These two embodiments can also be combined, to provide a highly dynamic, layered service experience to MVNO users. In contrast, as discussed above, conventional call models/iFCs simply provide a static, one-to-one mapping of service requests onto application servers, such that each user gets the same AS and thus the same service experience, regardless of the user's environment or MVNO subscription.

For other embodiments of systems and methods for dynamically creating and using call models, so that different users can have distinct IMS experiences, see, e.g., U.S. patent application Ser. No. 11/166,470. In some of these alternate embodiments, the S-CSCF is provisioned with logic that dynamically generates a call model in response to service requests by UEs, effectively generating "new filter codes" (NFCs) that supplant the iFCs loaded into the S-CSCF during UE registration. The NFCs are based on call models stored in a call model database for the different UEs that use the system. In contrast, some embodiments of Service Trees provide a single logical structure that can be used to generate a call model for all the users on the system. The call models can be generated using control logic that is separate from the S-CSCF, so the S-CSCF need not be provisioned to dynamically generate call models itself.

Figure 3:
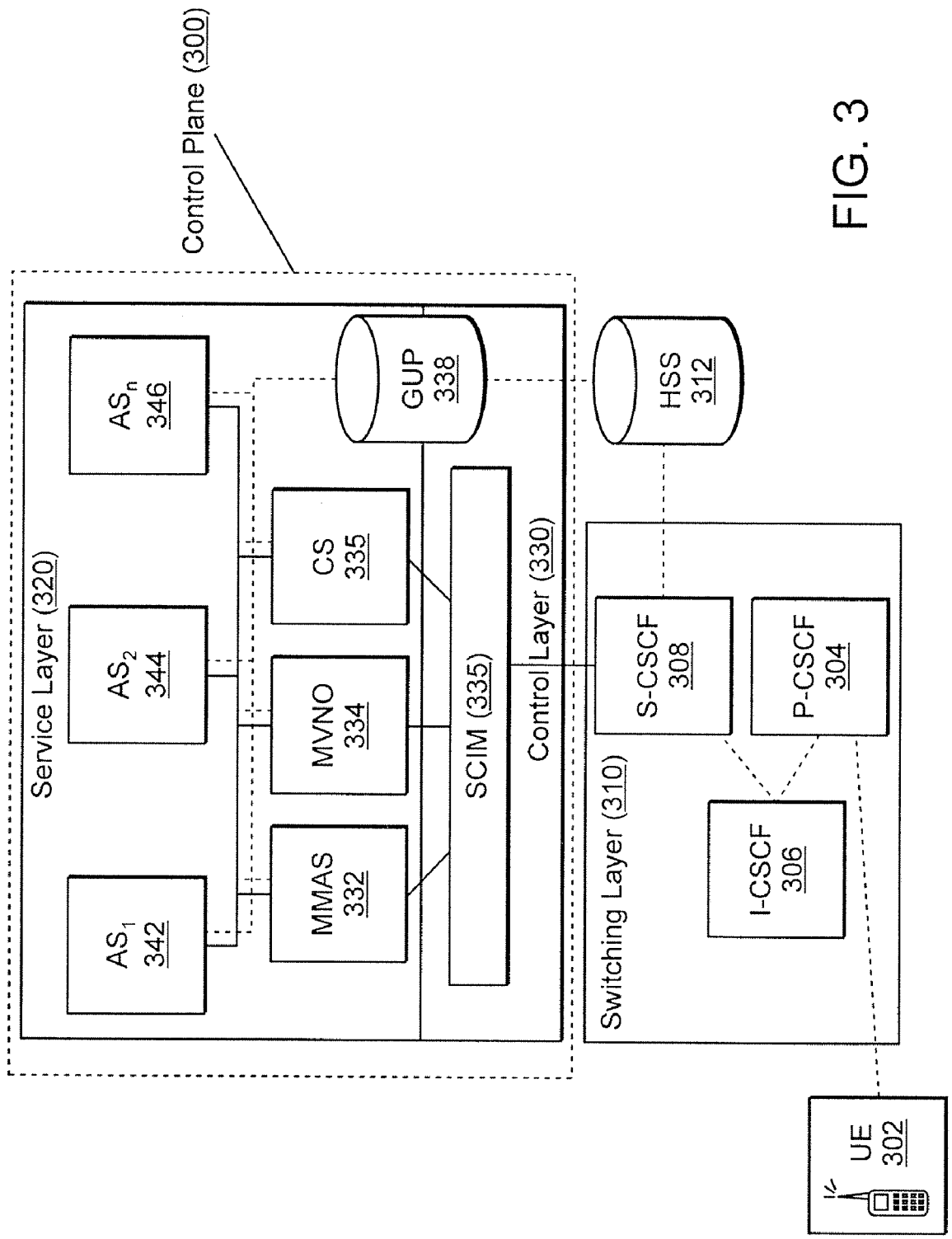
FIG. 3 is a schematic of a system for generating dynamic call models, according to some embodiments.

FIG. 3 schematically illustrates a system for providing dynamic call models to a UE 302. Unlike the conventional system of FIG. 1, the system of FIG. 3 includes logical components that generate new call models in response to multiple stimuli, e.g., during UE registration, service requests, changes in UE network environment, and changes in network operator policy. The system of FIG. 3 includes a switching layer 310 and a control plane 300 that is distinct from, but communicates with, the switching layer 310. In contrast, in the conventional system of FIG. 1, the switching layer is part of the control plane.

The control plane 300 is partitioned into a service layer 320 and a control layer 330. The service layer 320 includes multiple AS, e.g., $AS_1$ 342, $AS_2$ 344, and $AS_n$ 346, that provide services such as instant messaging to UE. The control layer 330 includes a Service Capability Interaction Management server 335 (SCIM) and a Generic User Profile database 338 (GUP), which together generate dynamic call models, as described in greater detail below. The SCIM 335 also includes "foundational" components that help to provide user experiences based on the user's real-time network environment and/or MVNO subscription and/or service requests. These foundational components include the Mobility Management Application Server (MMAS) 332, the MVNO server 334, and Combinational Service (CS) server 335. Briefly, the MMAS 332 ensures that a favorable network connection is used to communicate with the UE 302 by managing the switching of the UE from one network to another, e.g., using a Service Tree as described in greater detail below. For further details on some possible embodiments of the MMAS 332, see U.S. patent application Ser. No. 11/370,594, the entire contents of which are incorporated herein by reference. For further details on systems and methods for providing combinational services, and combinational services in general, see U.S. patent application Ser. No. 11/504,896, the entire contents of which are incorporated by reference.

The Combinational Services (CS) server 335 provides a "foundation" service (FS) at the root of the Service Tree, and is responsible for gathering, translating, proxying and/or forwarding the combinational capability exchange between the originating and terminating UEs.

The MVNO server 334 provides another FS at the root of the Service Tree, and manages the partitioning of transport streams and control processing resources, as well as the flexible charging mechanisms based on individual MVNO policies.

The Mobility Management server 332 provides another FS at the root of the Service Tree, and manages the vertical network handoff procedure to support seamless user session mobility between heterogeneous packet switched access networks. The access network types may include 2G/3G mobile wireless, WiFi and broadband access networks.

VideoShare Application Server logic (not shown) is responsible for maintaining a combined session context consisting of circuit-switched voice call and a multimedia connection such as real time video, stored video clips, and images throughout the duration of the voice call, thereby allowing consumers to have a richer voice experience with others.

The Service Capability Interaction Manager (SCIM) 335 co-ordinates invocation of specific service logic such as VideoShare, Dial-a-CAM (DAC) and/or Mobility Manager AS. It consults the Generic User Profile (GUP) database 338 to decide which set of services need to be applied for a call. For example, in some embodiments it determines whether a certain subscriber uses a dual-mode handset, and so the Mobility Management server 332 is invoked in addition to the request service invoked (e.g. VideoShare) or purely the latter.

The switching layer 310 of FIG. 3 includes conventional switching components, including P-CSCF 304, I-CSCF 306, S-CSCF 308. The S-CSCF 308 can be an "off-the shelf," conventional component, and need not be specially configured to communicate with the SCIM 335 beyond the configurations normally needed to provide communication with a conventional AS. Instead, the system uses conventional signal protocols to effectuate communication between the S-CSCF 308 and the SCIM 335. In a conventional system, if a UE wanted to communicate with an AS, it would send a request to the S-CSCF, e.g., a SIP Invite message. This request would trigger a service point trigger (SPT) based on an initial filter criteria (iFC) that is loaded into the S-CSCF from the HSS during UE registration. This SPT would normally cause the S-CSCF to forward the UE's request to the appropriate AS. In the embodiment of FIG. 3, this conventional signaling protocol also allows the S-CSCF 308 to communicate with the SCIM 335, instead of with the ASs 342, 344, and 346. Specifically, during UE 302 registration, the HSS 312 provides an iFC to the S-CSCF 308 as usual. Here, however, the iFC is pre-configured to point the S-CSCF to the SCIM 335 in response to service requests from the UE 302, instead of to the AS's 342, 344, and 346. Thus, the SCIM 335 effectively looks like an AS to S-CSCF 308, and does not interrupt the standard IMS logic flow. In this embodiment, all service request sent from the S-CSCF 308 are forwarded to the SCIM 335, which then dispatches each particular service request to one of the first level application servers (e.g. AS, $AS_2 \ldots AS_n$) based on the service triggers provisioned in the Service Tree database (GUP) 338.

The UE 302 communicates with the switching layer 310 as usual, e.g., communicates with S-CSCF 308 via P-CSCF 304 and/or I-CSCF 306, using standard protocols. Information that the UE 302 transmits to the S-CSCF 308 is then forwarded to the SCIM 335 for use in generating dynamical call models. The UE 302 transmits normal signaling information to the S-CSCF 308, e.g., the calling party's URI, the called party's URI where appropriate, and the SDP for the service requested. Optionally, UE 302 includes additional service parameters that indicate additional information that the system can use to generate dynamical call models as appropriate, e.g., information about the calling party's Access Network type, cell area or location, any combinational capabilities of the handset (which can change with handset architecture), and information about the MVNO. In some embodiments, the user identification information which identifies which MVNO the user has subscription with is sent to the UE, and the MVNO information is stored in the system. Systems and methods that allow the calling UE 302 to learn and transmit information about available Access Networks are described in greater detail below, and in the incorporated patent references. The SCIM 335 can also obtain information about the called party's Access Network type, e.g., from the GUP or from information elements included in the service requests, so the calling UE 302 need not know the called party's available Access Network(s). The parameters described herein are only examples of parameters that can be used to generate dynamical call models.

GUP 338 stores Service Trees for UEs within the domain of the S-CSCF 308, e.g., within the domain of a service provider. In some embodiments, the GUP database 338, which in some cases is referred to in the incorporated patent references as a call model database, has a conventional database architecture, although the information it stores, e.g., the Service Trees, is unconventional. The GUP returns the Service Trees to the SCIM 335 in response to requests from the SCIM. These requests can be in the form of conventional database look-up transactions.

Depending on the service logic, multiple stimuli cause the SCIM 335 to request a Service Tree from the GUP 338 and to generate a new call model. These stimuli can include, for example, UE 302 registration during power-on and new UE service requests. The SCIM 335 can also generate new call models while the UE 302 is already participating in a service, e.g., detection or change of access network, or change of location and cell area during an established IMS session. For example, as discussed in greater detail below, in some embodiments the UE 302 transmits an indication within the signaling message parameters whenever a new Access Network that the UE is capable of handling becomes available. This signal can trigger the SCIM 335 to request a new Service Tree and generate a new call model that may provide a different service to the UE 302, e.g., may transfer the existing call to the new network. Or, for example, if the network operator wants to enforce a change in policy, this change can trigger SCIM 335 to derive a new call model, even though the UE 302 did not request a service or change environment. Regardless of the stimulus, after receiving the Service Tree, the SCIM 335 then uses it to construct a call model and uses that call model to provide appropriate service to the UE 302, e.g., by invoking an appropriate AS to the UE.

Figure 5:
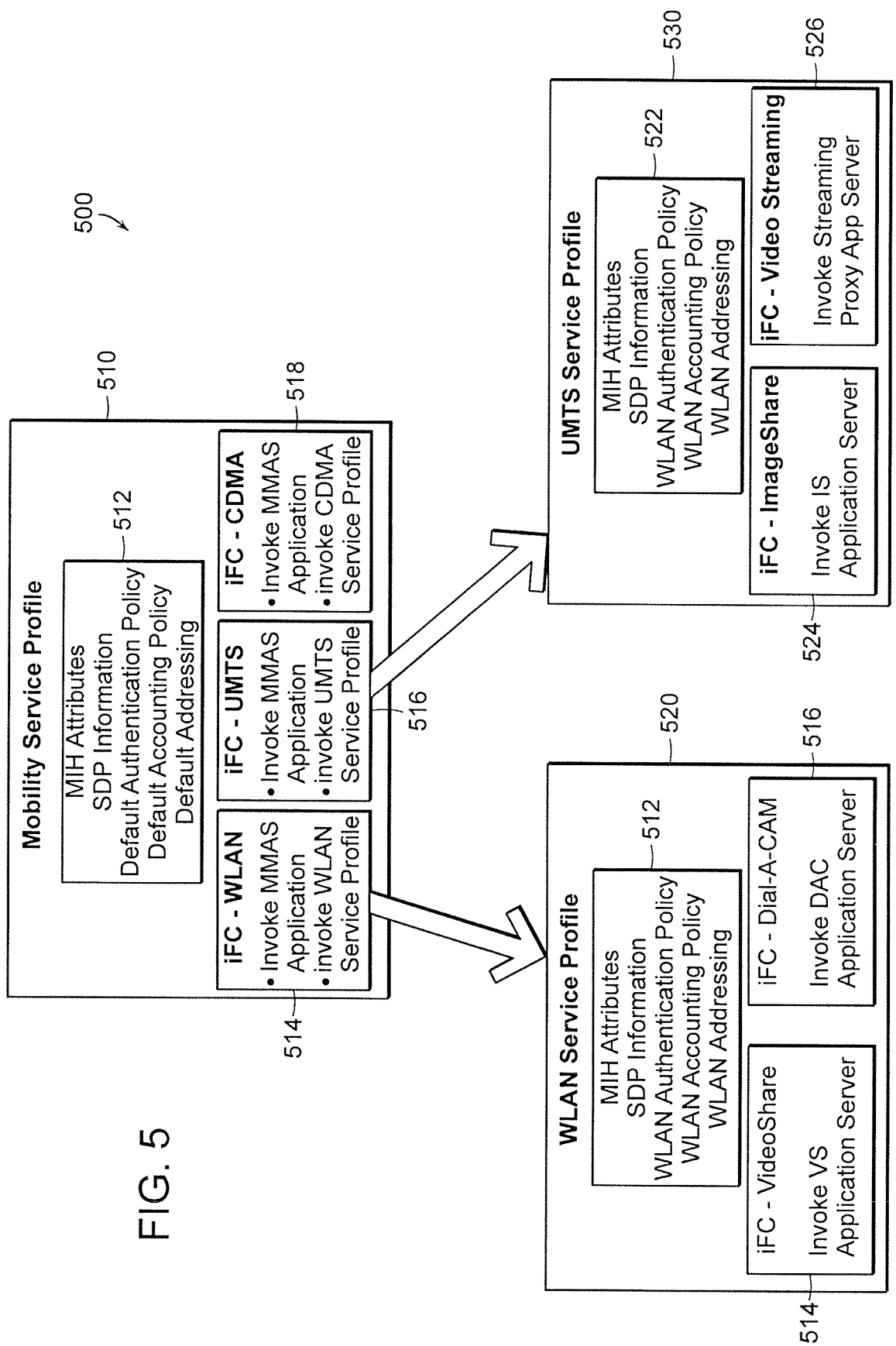
FIG. 5 is a schematic of a service tree for generating call models based in part on what access networks are available to a user's handset, according to some embodiments.

The Service Tree has a hierarchical logical structure that includes a "root node," "branch nodes," and "leaf nodes." In some embodiments, the "root node" represents a low-level, general type of service that the UE has requested (e.g., foundational services); the "branch nodes" provide one or more service options that can be provided to the UE; and the "leaf nodes" represent the AS's to be invoked to actually provide the selected service to the UE. The root note is invoked implicitly when the UE user initiates one of the explicit services represented by the leaf nodes. Each of the root and branch nodes includes one or more conditional elements that can be triggered by one or more parameters, such as a network being available to the UE, a subscription to a particular MVNO, or a billing policy provisioning change by the network operator (more below), and one or more paths that lead either to another branch node or to a leaf node. At least one of the root and branch nodes includes a plurality of conditional elements, providing a plurality of paths that lead either to another branch node, or to a leaf node. In some embodiments, as illustrated in FIG. 5, the services that can be invoked are provisioned in the form of iFC's; the conditional elements within iFCs include SPT's that are triggered by one or more parameters; and the selected service is invoked with the inclusion of a service profile, which describes the service policies that control the service and the next level service iFC based on the SPT conditions. Thus, the Service Tree causes the SCIM 335 to subsequently invoke another level of defined logical service. For example, a particular SPT in a given iFC at a branch node may cause the SCIM 335 to invoke a video-broadcasting AS associated with a WLAN network, instead of a 3G network, based on the signal strength of the two networks and the billing policy of the network operator.

The SCIM 335 logically traverses these logical features in a defined hierarchical order to generate a call model, i.e., "tree-walks." The SCIM 335 "tree-walks" the Service Tree by first executing logic at the root node, then executing code at an appropriate branch node. At each branch node, the SCIM 335 uses the parameters of which it is aware, e.g., the Access Networks available to the UE 302, whether the UE subscribes to an MVNO, whether the network operator's policy allows the UE to use a certain service, and/or whether the UE supports a particular combinational service requested, to determine which logical path to select next. The logical path that the SCIM 335 traverses eventually ends at an appropriate leaf node, defining the service to be provided to the UE 302, i.e., generating a call model. The SCIM 335 repeats this process each time it requests a Service Tree from the GUP 338. Thus, as the parameters for UE 302 change, the SCIM 335 generates different call models.

The "Service Tree" architecture is one example of a logical structure the SCIM can use to generate dynamic call models. Other logical structures will have the general characteristics of mapping multiple parameters, e.g., UE, subscription, and/or environmental parameters, onto multiple service options. The Service Trees (or other logical structures) can be different for each user or for particular groups of users, e.g., based on their subscriptions and/or handset architectures. Alternately, the Service Trees (or other logical structures) can be the same for all users, and provide different user experiences by mapping a wide variety of possible parameters onto a wide variety of service options. In some embodiments, the Service Tree is an object-oriented class model, based on a layering of classes, although other logical structures are possible.

Figure 4:
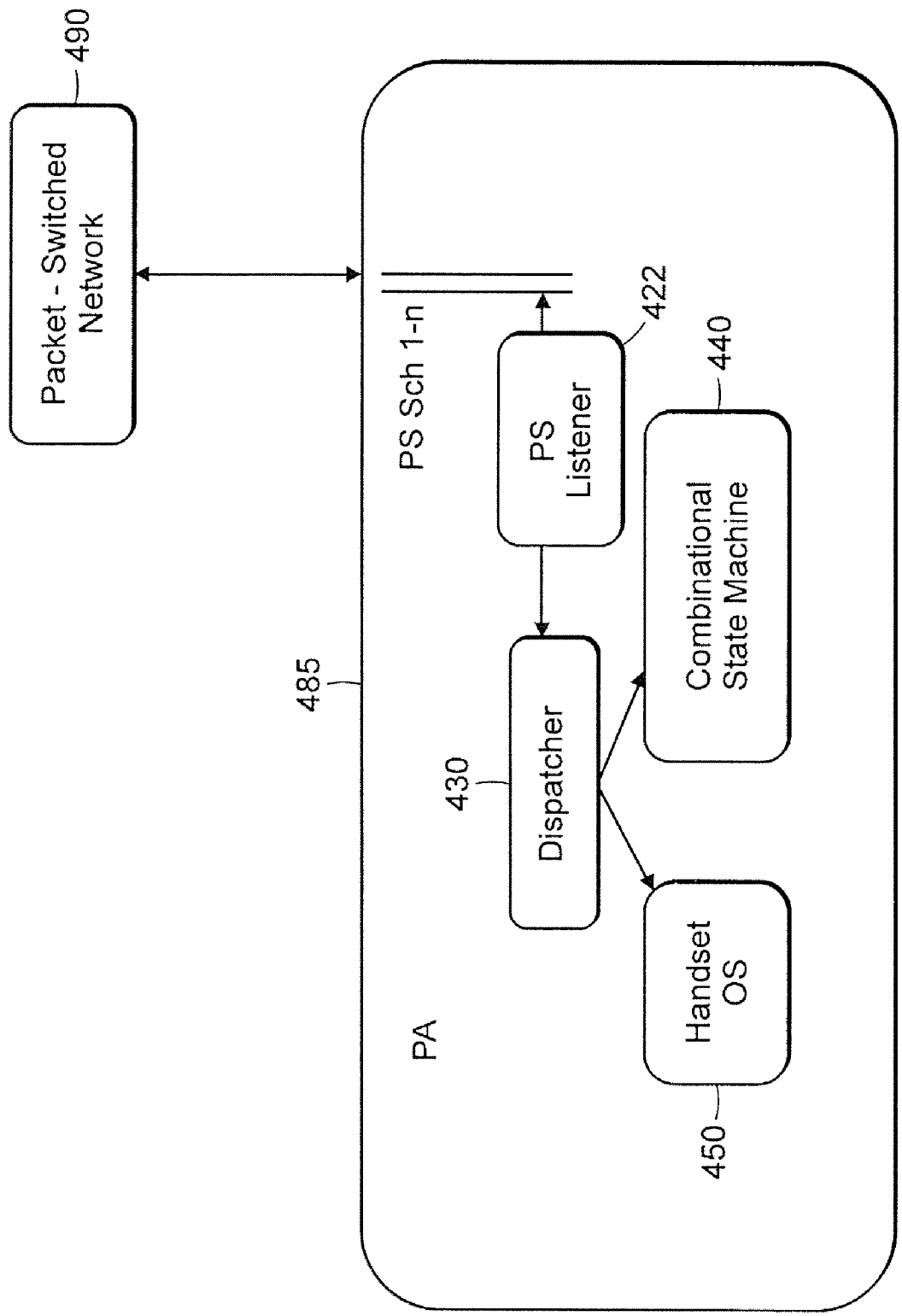
FIG. 4 is a schematic of a logical component that determines if the environment of a user's handset includes a new access network, according to some embodiments.

As briefly described above, in some embodiments, a Service Tree permits UE 302 to utilize multiple Access Networks that may become available via its local environment. Conventionally, handsets determine the availability of different Access Networks during registration, but do not subsequently monitor Access Networks that may become available and notify a vertical handoff information server in the network to request for operator specified handoff decision, for example. FIG. 4 illustrates a schematic of a logic component called the Personal Agent (PA) 485 that can be implemented on UE 302 to enable the UE to dynamically communicate with newly available and authorized Access Networks. The UE 302 supports a number of packet switched (PS) signaling channels (PS Sch 1-n) that provide access to the IMS (490). The PA 485 includes a PS "listener" 422 that receives messages on these channels, and directs these messages to a service logic component called the "dispatcher" 430. Dispatcher 430 uses internal logic to direct the messages appropriately to either the handset's operating system (OS) 450 or to the Combinational State Machine 440. The Combinational State Machine 440 then handles the message according to its service logic, for example, causes the UE 302 to transmit a signal to the network that a new Access Network has become available. For further details on the Personal Agent, see U.S. Pat. No. 11/504,896.

FIG. 5 depicts an embodiment of a Service Tree that provides "Mobility Service" to a UE, i.e., allows the UE to maintain a continuous session even when a vertical network handoff occurs across access networks in its local environment.

As illustrated in FIG. 5, Service Tree 500 includes a Mobility Service Profile 510, and subsidiary Access Network Service Profiles, e.g., WLAN Service Profile 520 and UMTS Service Profile 530. As used below, the term "Service Profile" is intended to mean a collective set of service policies that the network operator can define to be applied for a service session based on a set of parameters, such as the UE's current Access Network type. The Service Profiles include conditional elements for determining what service to provide, as well as informational elements that dictate the billing and signaling policies for that service.

Within Service Tree 500, the Mobility Service Profile 510 enables selection of a given Access Network service profile 520 or 530 based on a set of parameters. The Access Network service profiles 520 or 530 in turn, if chosen, relay the control of user session to an AS that is specific to the selected Access Network. The Mobility Service Profile 510 includes informational elements regarding standard services 512, including MIH (Mobile Independent Handoff) attributes, SDP (Service Description Protocol) information, and default AAA policies. MIH is an IEEE standard specification that defines a common protocol to facilitate seamless handover across heterogeneous access networks and thus enable mobile users to experience a substantially continuous (seamless) experience during handover. SDP is an IETF standard specification for describing multimedia sessions for the purposes of session announcement, session invitation, and other forms of multimedia session initiation.

The Mobility Service Profile 510 also includes iFCs for different Access Networks that the UE might potentially encounter in its local environment and which it is authorized to access. In the illustrated embodiment, the profile includes iFCs for WLAN (Wireless Local Area Network) (520), UMTS (Universal Mobile Telecommunications System) (530), and CDMA (Code Division Multiple Access) (540). Each of the iFCs 520, 530, and 540 includes an SPT to invoke a Service Profile associated with the appropriate Access Network, as well as an SPT to invoke a Mobility Management Application Server (MMAS), which is a foundation service as mentioned above. The MMAS provides Multimedia Session Mobility Control within a pre-IMS or IMS SIP signaling network environment to enable seamless multimedia service experience across vertical network handoffs (e.g., UMTS to WLAN or vice versa). The decision on which access network profile to use is dictated by information received from the UE and access network conditions, as well as policies provisioned as user preference or service operator control policy. These are referred to as dynamic service triggers. The selection is invoked by the MMAS application based on these dynamic triggers. The SPT triggers only invoke MMAS application. In one exemplary embodiment, a transaction for generating a call model based on a service tree is as follows:

1. The UE initiates an IMS streaming session request (SIP Invite message) to a RTSP Streaming Proxy server via the S-CSCF from a UMTS access network.

2. The S-CSCF retrieves IMS Service Profile of UE and inspects the provisioned list of iFC(s) to find a match that triggers the invocation of the SCIM server URI address.
3. The S-CSCF routes the IMS streaming service request (SIP INVITE message) to the SCIM server.
4. The SCIM is the first component within the server to receive the IMS session request. The SCIM inspects the UE subscriber's service profile to retrieve the Service Tree. In this example, the UE subscriber has subscription to a Service Tree model which consists of Mobility Management service (i.e., MMAS) and RTSP Streaming service (RTSP Proxy AS).
5. The SCIM first executes on the iFC for UMTS to invoke the MMAS, based on UE user's Mobility service subscription and UMTS access network type triggers, by passing the IMS streaming session request along with a UMTS service profile and an RTSP Proxy AS iFC to the MMAS.
6. The MMAS then executes the mobility management logic and applies policies defined in the UMTS service profile.
7. The MMAS then passes the IMS streaming session request to the SCIM with the RTSP Proxy AS iFC.
8. SCIM then invokes the RTSP Proxy AS URI as defined in the iFC and passes a UMTS access service profile to the RTSP Proxy AS.
9. The RTSP Proxy AS initiates a RTSP session with a streaming server.
10. The RTSP Proxy AS sends a response message back to the MMAS.
11. Once the MMAS receives the SIP 200 OK response from the RTSP Proxy AS, it sends the response back towards the UE via the S-CSCF to complete the establishment of the IMS streaming session from the UE to a streaming server.

The Service Profiles associated with the different Access Networks for which iFCs are provided define the services that the Access Network supports, and their specific user policies. For example, the Service Profile for WLAN 520 includes standard services 512 which are particular to the Service Profile, including MIH (Mobile Independent Handoff) attributes, SDP information, and AAA policies for the profile. The Service Profile for WLAN 520 also includes iFCs for authorized services available through the Access Network, such as Video Share 514 and Dial-A-CAM 516, along with the triggers that invoke the appropriate AS, e.g., that invoke the Video Share AS or the Dial-A-CAM AS. Similarly, the Service Profile for UMTS 530 includes standard services 522 which are particular to the Service Profile, including MIH attributes, SDP information, and AAA policies for the profile. The Service Profile for UMTS also includes iFCs for authorized services available through the Access Network, such as Image Share 526 and Video Broadcast 526, along with the triggers that invoke the appropriate AS, e.g., that invoke the Image Share AS or the Video Broadcast AS. As discussed in the incorporated patent references, Video Share enables a user to personalize a voice call by adding a video stream from his UE to a call with another UE. Either party can augment the voice call with video, and the video portion can begin and end multiple times within the context of a single voice call. In some embodiments, Video Share conforms to the GSM-A definition of video sharing. Also as discussed in the incorporated patent references, the Dial-A-CAM application enables mobile users to access one or more network cameras located on an Internet connection, by dialing a telephone number with feature code prefix. Also as discussed in the incorporated patent references, the Image Share application allows users to share an image with another user(s) during a voice call. The image can be shared by any party to the call, and multiple images can be shared during a single call. The imaged can be obtained by taking a picture with the UE's camera during the call, or can be pre-stored on the UE.

Because a Service profile is provided for each Access Network, the choice of Access Network is policy-based (i.e., not just based on signal strength) and is based on the immediate context of the user's environment. In other words, the decision of making a handoff from one Access Network to another is based on dynamic context weighting by well-defined policy in each Access Network profile. Among other things, this allows a superior, or correct, Access Network to be chosen for a given multimedia service. Additionally, the service rendering can be implemented by an Access Network-specific AS that supports a specific business model, e.g., service agreement.

In another embodiment, a Service Tree provides the partition and operation of the IMS network and services by various brand names, that is, according to a Mobile Virtual Network Operators (MVNO) business model, but allowing each MVNO to provide unique services to their subscribers. As discussed above, a network operator can provide wholesale network service to one or more retailers, who in turn provide network service either to subscribers or to a subsidiary retailer. The Service Tree allows each retailer to independently set its own policies and thus provide distinctive services to their subscribers, e.g., by specifically provisioning their own AS's to provide services. In contrast, conventional call models/iFCs generally do not allow MVNO retailers that share a wholesaler to provide distinctive services to their respective subscribers.

Figure 6:
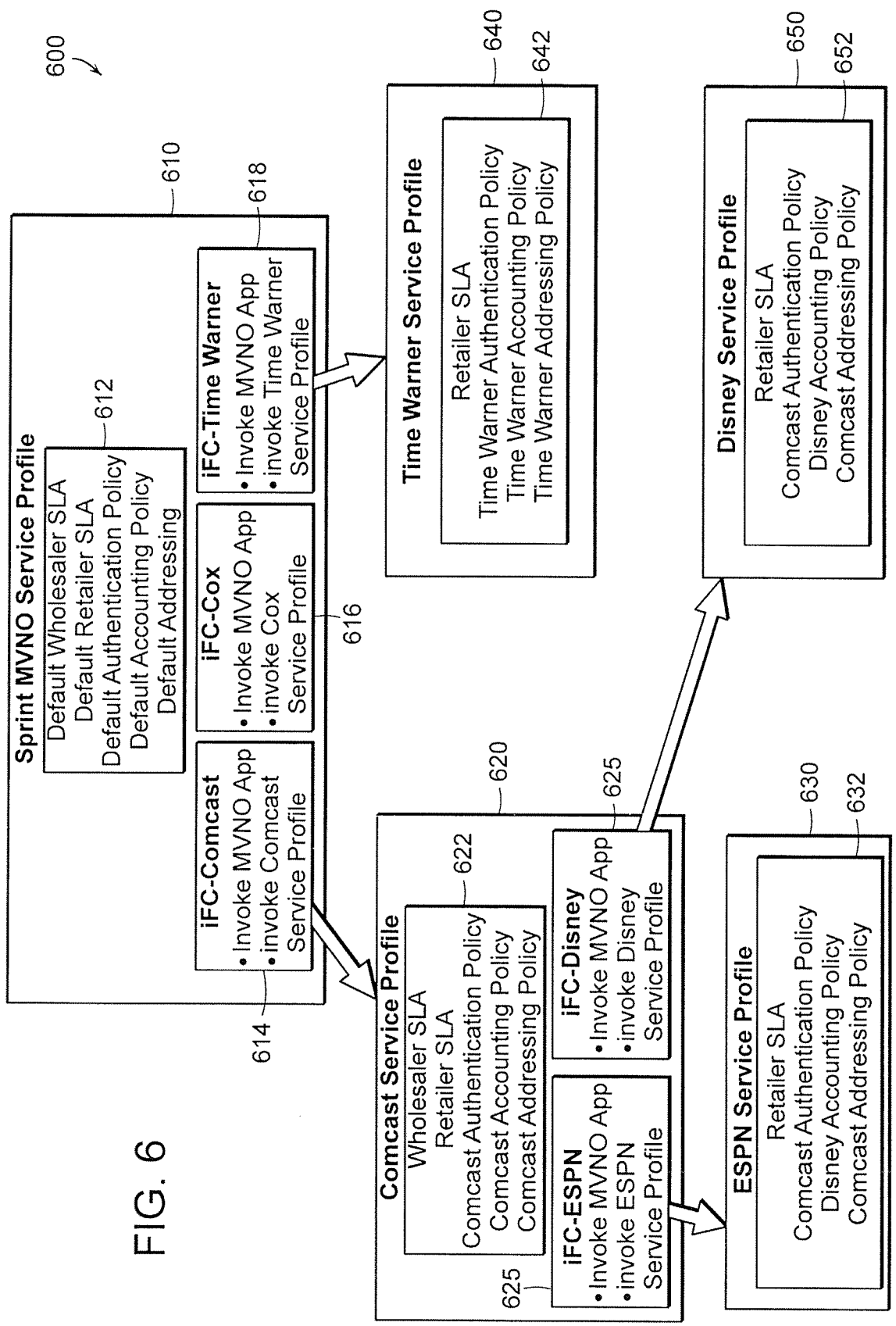
FIG. 6 is a schematic of a service tree for generating call models based in part on whether the user subscribes to a mobile virtual network operator, according to some embodiments.

FIG. 6 depicts an embodiment of a Service Tree 600 that provides a hierarchical MVNO service data model. In this model, a wholesale service provider such as Sprint provides wholesale network service to one or more retailers, e.g., Comcast, Time Warner or Cox Communication. Sprint defines its retailers default policies, but the retailers can independently set their own policies and make appropriate services available to their subscribers. This allows users to use the same network, but to have different user experiences based on the policies defined by the retailer service profiles. The retailer can also host their own wholesale business by having subsidiary retailers. For example, as shown in FIG. 6, ESPN and Disney are subsidiary retailers of Comcast. Both ESPN and Disney use authentication and addressing services belonging to Comcast, the wholesaler, but maintain their own accounting service policies to achieve different business models.

The Service Tree 600 includes an MVNO Service Profile for wholesale network provider Sprint 610, as well as MVNO Service Profiles for retailers Comcast 620 and Time Warner 640, and subsidiary retailers ESPN 630 and Disney 650. The wholesaler MVNO Service Profile 610 defines a plurality of default policies 612, including wholesaler Service Level Agreement (SLA), retailer SLA, and AAA policies. The wholesaler MVNO Service Profile 610 also includes a plurality of iFC's for retailer MVNO's that purchase network service from the wholesalers, e.g., iFC's for Comcast 614, Cox 616, and Time Warner 618. These retailer MVNO iFC's include SPT's to trigger the appropriate retailer MVNO Service Profile, as well as the MVNO server within the SCIM The MVNO application server provides logic for logical and physical resource management and allocation. Thus, if a UE associated with a particular retailer, e.g., Comcast, initiates a service request, that request triggers the Comcast iFC 614, which in turn invokes the Comcast Service Profile 620.

The retailer MVNO Service Profiles 620 and 640 include sets of MVNO-specific policies, 622 and 642, respectively. These sets of policies define IMS resources allocation, e.g., physical and logical resources allocation, and Service Level Agreement (SLA) between the wholesaler and retailers, as well as AAA policies, and SLA policies for subsidiary retailers that purchase service from the retailer. Based on the MVNO service profile, the control of user session is relayed to a retailer specific AS that provides, among other things, the authentication, accounting, and addressing services that are specific to the retailer's business. The SLA, as part of MVNO service profile, can be different for users who are homing or roaming the network. The differences in policy for homing or roaming users may include the number of sessions allowed or the QoS enforced for the multimedia services.

In summary, using Service Trees to partition MVNO services among retailers allows the retailers to tailor IMS services to achieve various businesses marketing strategies. Network resources and service rendering are partitioned and controlled dynamically based on the MVNO service profiles.

Figure 7:
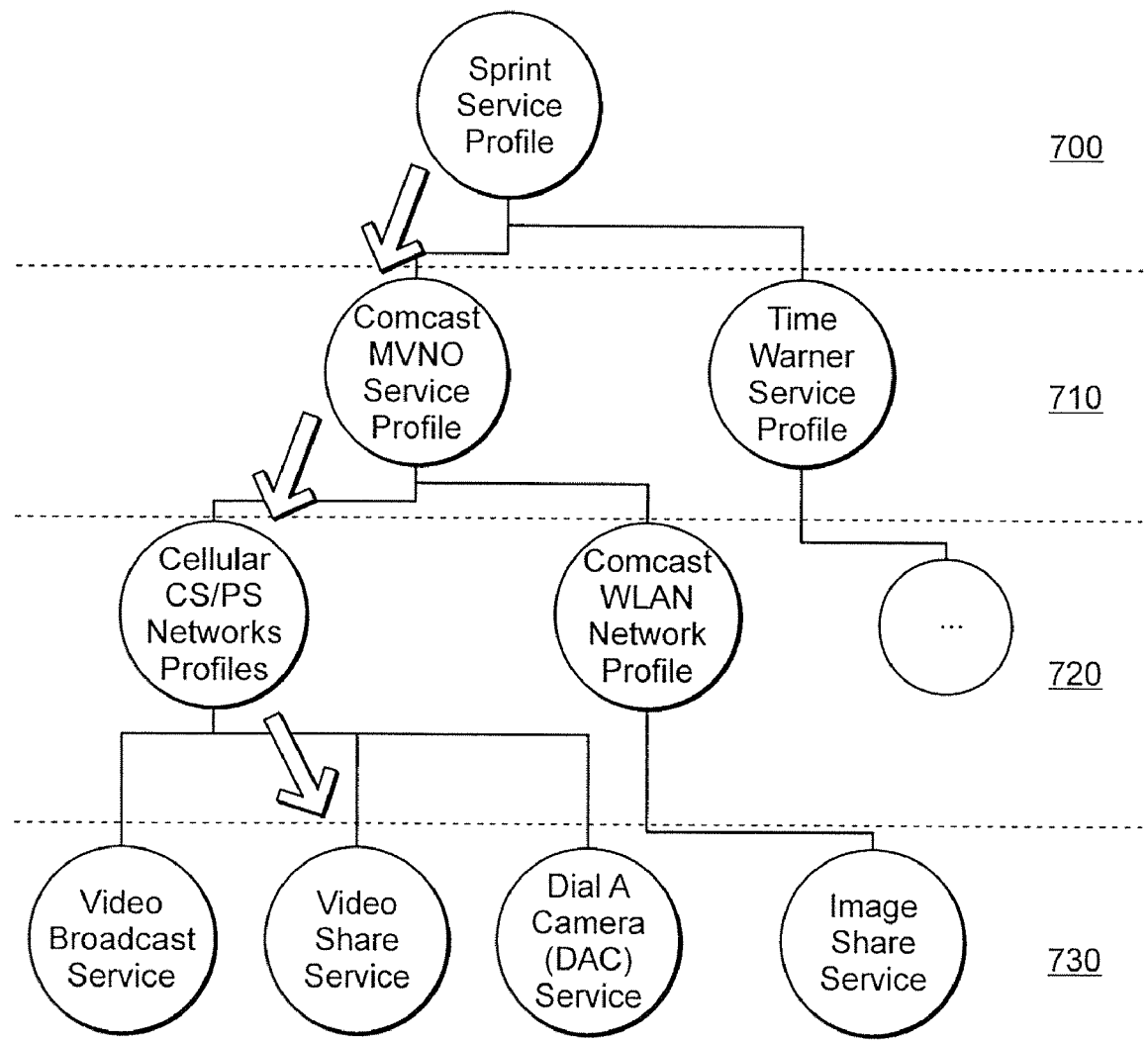
FIG. 7 is a high level overview of a service tree for generating call models based in part on whether the user subscribes to a mobile virtual network operator and in part on what access networks are available to the user's handset, according to some embodiments.

Service Trees can also be designed to allow MVNO subscribers to dynamically use services on Access Networks that may become available to them, e.g., to combine the two embodiments described in detail above. FIG. 7 is a high-level schematic of an embodiment of a Service Tree that supports the layering of an MVNO business model with Access Network-Specific media services. The service tree includes multiple service layers that are hierarchically invoked based on trigger conditions that match the trigger policies defined within that level's service specific profile provisioned for the user. For example, the highest level 700 "root node" includes a Service Profile 700 for MVNO wholesaler Sprint. The next level 710, a "branch node," includes Service Profiles for MVNO retailers Comcast and Time Warner, which are selected based on which MVNO the user subscribes to. The next level 720, another "branch node," includes Service Profiles for different Access Networks that the retailer supports, which are selected based on, e.g., whether the user's UE is in the range of that Access Network and what the retailer's policies are. The lowest level 730, the "leaf nodes," invokes the appropriate AS based on multiple parameters as described in greater detail above. Note that the Service Tree is not limited to the number of levels shown, that any desired of numbers of levels can be included as appropriate.

The SCIM can generate a call model based on the Service Tree of FIG. 7 as follows. The UE transmits a SIP REGISTER message to the SCIM, e.g., via the switching layer as discussed in greater detail above. The SCIM function handles the SIP REGISTER message using the prefix tree walking of the Service Tree. The term "prefix tree" is intended to indicate a structure used to store the textual elements for efficient searching, and also can be called a trie. The SCIM first retrieves the root level Service Profile for use in applying the service logic of the root application server, and matches the UE's REGISTER context to an iFC, which triggers a wholesaler MVNO Service Profile. The SCIM function retrieves the wholesaler MVNO Service Profile, 700, e.g., Sprint Service Profile, and matches the user's REGISTER context to an iFC within the wholesaler Service Profile, which in turn triggers a retailer specific MVNO profile. The SCIM then retrieves the retailer specific MVNO profile 710 and invoke a proper MVNO-AS that performs MVNO specific service functionality. For example, among other things, the MVNO-AS checks to see if the session quota has been exceeded for registration. The session quota is a logical resource limit used by the MVNO server logic for resource allocation and protection. If the quota has been exceeded, the request is rejected. If not, the MVNO specific AAA (Authentication, Accounting, and Addressing) services will be invoked to handle this registration. Note that some or all of services invoked by the MVNO-AS may be inherited from the wholesaler service profile, e.g., brand name retailers can leverage the wholesaler's default services, since the wholesaler Service Profile is already in the tree-walking path. The SCIM can continue to tree-walk, for example invoking additional sub-retailer service profiles 720.

The prefix tree-walking then continues to the next branch node in the Service Tree. On this node, for example, there are multiple access networks provisioned, and the SCIM retrieves the Mobility Service Profile (not shown) to invoke a MMAS that performs user specific mobility management functionality. Based on the user context, MMAS chooses the proper Access Network Profile, for example, among other things, to create mobility session context and to subscribe to the Media Independent Handoff (MIH) events of the mobile handset that is registering to the IMS.

The service tree maintains the "ownership" of application services such as music download, video streaming, push to talk, and push to see at level 730. The ownership is provisioned by using tree branches. For example, application services dedicated to an Access Network or to a MVNO retailer are provisioned as leaf nodes under the branch of such Access Network profile or MVNO profile. Take the instance of a SIP INVITE call. The SCIM function of the preferred embodiments of the invention traverses the service tree in the prefix order. It visits the branch node if there is an iFC trigger invocation, or passes through the branch node of Service profile if there is no iFC trigger invocation. For example, if Mobility Management service is to be provided to the user, the branch node of user specific Mobility Service profile is visited. Subsequently, the branch node of Access Network specific service profile, and finally, one of the leaf nodes of application service profiles under the Access Network. Of course, the application service leaf node may be extended to have the next level of service profiles and correspondent Application Server if necessary.

Note that the hierarchy need not be as deeply layered as illustrated in FIG. 7, e.g., the ASs 730 may be associated with and directly invoked from a higher level MNVO 710. The hierarchy can also be more deeply layered than illustrated in FIG. 7, e.g., with many different retailers and sub-retailers. Overall, the SCIM retrieves the provisioned service profiles and iFC triggers that are provisioned and arranged in a hierarchical Service Tree structure order, and invokes the application server (or logic) that processes the service profile. The service profile and iFC trigger information, along with the session request messages, are passed to the invoked application. After the application server completed processing the service request, the SCIM will then retrieve the next level application service profile set up in the Service Tree and invoke that next level application server by passing that service profile and iFC trigger information along. This procedure continues until the application service logic at the leaf of the Service Tree has been invoked.

Figure 8:
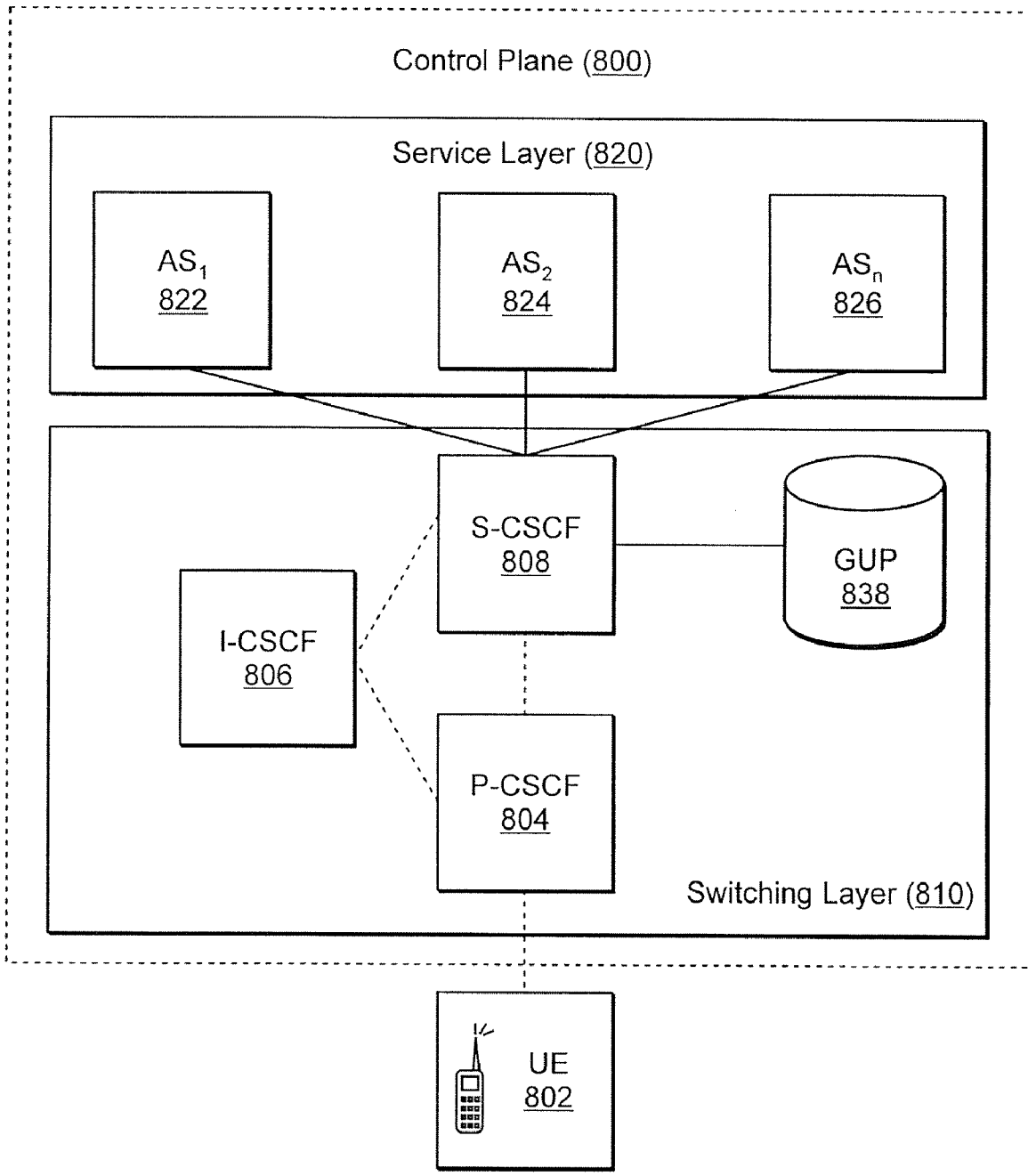
FIG. 8 is a schematic of a system for generating dynamic call models, according to some embodiments.

Although the embodiments described above include a conventional S-CSCF that is effectively "out of the box," but includes a GUP and a SCIM to generate call models, other embodiments are possible. FIG. 8 shows one embodiment in which an S-CSCF 808 includes logic to generate call models based on Service Trees obtained from the GUP 838. The S-CSCF 8008 then directly contacts the AS 822, 824, 826 to provide services to the UE 802.

In still other embodiments, such as those described in U.S. patent application Ser. No. 11/289,924, the system includes a component that is in communication with S-CSCF, and receives information with which it dynamically constructs a new filter code (NFC) based on the Service Trees. The component then provides the NFC to the S-CSCF, which then uses it as though it were a normal iFC, and points service requests to the AS. In this embodiment, the component is "out of band" of the control plane, i.e., it provides information to the S-CSCF but does not itself route service requests between the UE and ASs. The NFCs are provided to the S-CSCF on a dynamic basis.

Note also that the SCIM may also be a component of a more complicated apparatus. For example, U.S. patent application Ser. No. 11/504,896 describes a Serving Node (SN) that includes a SCIM and a GUP database, as well as other components that facilitate communication between the SN, the SCIM, and the IMS core, in addition to various AS, to networked devices, and to the circuit-switched voice call network. Among other things, the Serving Node facilitates "combinational services" that use, or switch between, both circuit-switched voice calls and packet-switched IMS services.

Incorporated Patent References

Embodiments of the present invention build on techniques, systems and methods disclosed in earlier filed applications, referred to herein as the "incorporated patent references," including but not limited to the following applications, the entire contents of which are incorporated herein by reference:

- U.S. patent application Ser. No. 11/166,470, filed Jun. 24, 2005, entitled System and Method to Provide Dynamic Call Models for Users in an IMS Network;
- U.S. patent application Ser. No. 11/166,407, filed Jun. 24, 2005, entitled Method and System for Provisioning IMS Networks with Virtual Service Organizations Having Distinct Service Logic;
- U.S. patent application Ser. No. 11/166,456, filed Jun. 24, 2005, entitled Method of Avoiding or Minimizing Cost of Stateful Connections Between Application Servers and S-CSCF Nodes in an IMS Network with Multiple Domains;
- U.S. patent application Ser. No. 11/166,406, filed Jun. 24, 2005, entitled Mediation System and Method for Hybrid Network Including an IMS Network;
- U.S. Provisional Patent Application No. 60/735,112, filed Nov. 9, 2005, entitled System and Method to Allow Interruption of Unicast Data Service Utilizing a Class B Handset or a Dual Mode Handset (DMH) to Inform it of a Circuit-Based Incoming call, so the Handset Can Accept the Call if the User Desires;
- U.S. patent application Ser. No. 11/283,038, filed Nov. 18, 2005, entitled System and Method of Interworking Non-IMS and IMS Networks to Create New Services Utilizing Both Networks;
- U.S. patent application Ser. No. 11/283,042, filed Nov. 18, 2005, entitled System and Method to Mediate Delivery of Legacy, Non-IMS Services into an IMS Network;
- U.S. patent application Ser. No. 11/282,924, filed Nov. 18, 2005, entitled IMS Networks with AVS Sessions with Multiple Access Networks;
- U.S. Provisional Patent Application No. 60/776,137, filed Feb. 23, 2006, entitled Enabling Combinational Services in Networks that Do Not Support Multiple Radio Access Bearers;
- U.S. Provisional Patent Application No. 60/779,954, filed Mar. 7, 2006, entitled Using Telephony Interface for Invoking Data Services in Wireless Communication Networks;
- U.S. patent application Ser. No. 11/370,793, filed Mar. 8, 2006, entitled Digital Home Networks Having a Control Point Located on a Wide Area Network;
- U.S. patent application Ser. No. 11/370,594, filed Mar. 8, 2006, entitled Associated Devised Discovery in IMS Networks;
- U.S. Provisional Patent Application No. 60/800,688, filed May 16, 2006, entitled System and Method for Supporting Combinational Services Without Simultaneous Packet and Circuit Connections;
- U.S. Provisional Patent Application No. 60/809,029, filed May 26, 2006, entitled System and Method for Supporting Combinational Services Without Simultaneous Packet and Circuit Connections;
- U.S. patent application Ser. No. 11/504,896, filed Aug. 16, 2006, entitled System and Method for Enabling Combinational Services in Wireless Networks by Using a Service Delivery Platform;
- U.S. patent application Ser. No. 11/709,469, filed Feb. 22, 2007, entitled Systems and Methods for Enabling IP Signaling in Wireless Network;
- U.S. Provisional Patent Application No. 60/918,863, filed Mar. 19, 2007, entitled Systems and Methods for Rendering Multimedia Objects as Incoming Voice Call Indicators;
- U.S. Provisional Patent Application No. (TBA), filed concurrently herewith, entitled Systems and Methods for Preserving Digital Rights and Personal Content in Combinational Services; and
- U.S. Provisional Patent Application No. (TBA), filed concurrently herewith, entitled Systems and Methods for Real-Time Cellular-To-Internet Video Transfer.

The present techniques, however, are not limited to systems and methods disclosed in the incorporated patent references. Thus, while reference to such systems and applications may be helpful, it is not believed necessary to understand the present embodiments or inventions.

It will be further appreciated that the scope of the present invention is not limited to the above-described embodiments, but rather is defined by the appended claims, and that these claims will encompass modifications of and improvements to what has been described.

What is claimed is:

1. A system for generating dynamic call models within an IP Multimedia Subsystem (IMS) network so that different user entities (UEs) can have different IMS service experiences, the IMS network including application servers (ASs) for providing services to the UEs based on service requests by the UEs, the IMS network further including a serving call state control function (S-CSCF) for receiving service requests by the UEs and forwarding the requests, the system comprising:

storage media storing a service tree, the service tree defining a plurality of potential call models, the potential call models mapping potential service requests by the UEs onto the ASs, at least two of the potential call models mapping a specified potential service request by a UE onto different ASs capable of providing different service experiences to the UE; and control logic for providing session control for the UEs, the control logic receiving service requests by the UEs forwarded by the S-CSCF and receiving the service tree from the storage media;

the control logic generating a call model for each UE based on the potential call models defined by the service tree and on the service requested by that UE; and the control logic invoking a specified AS based on the call model generated for that UE.

2. The system of claim 1, wherein the control logic is in direct communication with the ASs.

3. The system of claim 1, wherein the storage media stores a plurality of service trees for different groups of UEs.

4. The system of claim 1, wherein the S-CSCF forwards service requests by the UEs based on a pre-configured initial filter criteria (iFC).

5. The system of claim 4, wherein the S-CSCF obtains the pre-configured iFC from a home subscriber subsystem (HSS).

6. The system of claim 1, wherein at least one UE includes agent logic to express a dynamic context of the UE in a message and to transmit the dynamic context message to the S-CSCF.

7. The system of claim 6, wherein the dynamic context of the UE comprises an access network that becomes newly available to the UE.

8. The system of claim 6, wherein the S-CSCF forwards the service request message with dynamic context information to the control logic based on a pre-configured initial filter criteria (iFC).

9. The system of claim 8, wherein the control logic generates a new call model for the UE based on the forwarded dynamic context message.

10. The system of claim 1, wherein the control logic generates the call model based on a change in policy by a network operator using the control logic and the S-CSCF.

11. The system of claim 1, wherein a plurality of mobile virtual network operators (MVNOs) use the control logic and the S-CSCF to provide services to groups of UEs subscribing to the MVNOs, and wherein at least some services that a first MVNO provides to a first subscribing group of UEs are different from at least some services that a second MVNO provides to a second subscribing group of UEs.

12. The system of claim 11, wherein the control logic uses the service tree to generate call models for the first and second groups of UEs, and wherein the service tree maps service requests by the first subscribing group of UEs to ASs owned by the first MVNO, and wherein the service tree maps service requests by the second subscribing group of UEs to ASs owned by the second MVNO.

13. A method of generating dynamic call models within an IP Multimedia Subsystems (IMS) network so that different user entities (UEs) can have different IMS experiences, the IMS network including application servers (ASs) for providing services to the UEs based on service requests by the UEs, the IMS network further including a serving call state control function (S-CSCF) for receiving service requests by the UEs and forwarding the requests, the method comprising:

storing a service tree, the service tree defining a plurality of potential call models, the potential call models mapping potential service requests by the UEs onto the ASs, at least two of the potential call models mapping a specified potential service request by a UE onto different ASs capable of providing different service experiences to the UE;

providing session control for the UEs by:

receiving service requests by the UEs forwarded by the S-CSCF;

receiving the stored service tree; and generating a call model for each UE based on the potential call models defined by the service tree and on the service requested by that UE.

* * * * *